(12) United States Patent
Rossman

(10) Patent No.: US 8,876,404 B2
(45) Date of Patent: Nov. 4, 2014

(54) RECEPTACLE CONNECTOR HAVING INTERNAL LATCHING MECHANISM

(75) Inventor: Jared Evan Rossman, Dover, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 422 days.

(21) Appl. No.: 13/271,393

(22) Filed: Oct. 12, 2011

(65) Prior Publication Data

US 2013/0094811 A1 Apr. 18, 2013

(51) Int. Cl.
*G02B 6/36* (2006.01)
*G02B 6/38* (2006.01)
*H01R 13/625* (2006.01)
*H01R 13/627* (2006.01)
*G02B 6/42* (2006.01)

(52) U.S. Cl.
CPC .......... *H01R 13/6275* (2013.01); *G02B 6/3817* (2013.01); *G02B 6/4292* (2013.01); *G02B 6/3825* (2013.01); *G02B 6/3897* (2013.01)
USPC ................... 385/75; 385/76; 385/88; 385/92; 439/345; 439/352; 439/357

(58) Field of Classification Search
CPC .. G02B 6/3817; G02B 6/3825; G02B 6/3897; G02B 6/4249; G02B 6/4292; H01R 13/6271–13/6272; H01R 13/6275
USPC .......... 385/53–81, 88–92, 139; 439/159, 345, 439/352, 357, 483, 638
See application file for complete search history.

(56) References Cited

U.S. PATENT DOCUMENTS

| | | | |
|---|---|---|---|
| 7,156,683 B2 | 1/2007 | Gupta et al. | |
| 2004/0127079 A1* | 7/2004 | Nagata | 439/159 |
| 2006/0084313 A1 | 4/2006 | Gupta et al. | |
| 2007/0049126 A1 | 3/2007 | Hsu et al. | |

FOREIGN PATENT DOCUMENTS

EP 1434315 A1 6/2004

OTHER PUBLICATIONS

International Search Report, International Application No. PCT/US2012/059419, International Filing Date Oct. 10, 2012.

* cited by examiner

*Primary Examiner* — Uyen Chau N Le
*Assistant Examiner* — Michael Mooney

(57) ABSTRACT

A receptacle connector including a receptacle housing having a housing cavity that is configured to receive a plug connector. The housing cavity is defined by an interior sidewall that extends along the mating axis and has a guide track thereon. The receptacle connector also includes a communication component that is disposed within the housing cavity and configured to communicatively engage the plug connector. The receptacle connector also includes a coupling member that is disposed within the housing cavity and is configured to engage the plug connector. The coupling member is movable bi-directionally along a mating axis and has a latch element that is slidably engaged to the guide track of the sidewall. The guide track forces the latch element toward the plug connector as the coupling member moves along the mating axis. The latch element capturing the plug connector in a locked position.

20 Claims, 6 Drawing Sheets

RECEPTACLE CONNECTOR HAVING INTERNAL LATCHING MECHANISM

BACKGROUND OF THE INVENTION

The subject matter described and/or illustrated herein relates generally to receptacle connectors that are configured to receive and communicatively engage plug connectors within housing cavities.

Various types of communication systems (e.g., switch boxes, cabling patch panels, wiring closets, and computer I/O) use connector assemblies that include plug and receptacle connectors in which the plug connector is inserted into a cavity of the receptacle connector. As one example, RJ45 plug connectors include eight exposed pins at a leading end of the RJ45 plug connector. The leading end is inserted into a cavity of a corresponding receptacle connector where the pins electrically engage mating conductors within the cavity. Plug connectors typically have an external attachment mechanism that engages the receptacle connector to prevent the plug connector from being inadvertently removed. For example, an RJ45 plug connector has an external spring-loaded tab. The tab is deflected toward the RJ45 plug connector when the leading end is inserted into the cavity of the receptacle connector. The tab forms a snap-fit with the receptacle connector when the leading end reaches a mated position. To remove the RJ45 plug connector, the tab is depressed (e.g., by a finger of the user) until the tab clears the receptacle housing and the RJ45 plug connector is free to be withdrawn.

However, external tabs, such as those used by RJ45 plug connectors, must be accessible to the user so that a user's finger can depress the latch. If the communication system requires a number of receptacle connectors, such as in a patch panel, the receptacle connectors must be spaced sufficiently far apart so that the user's finger may fit between adjacent plug connectors that are mated with the receptacle connectors. However, it is generally desirable to increase the density of receptacle connectors in communication systems in order to minimize size of the connector assembly.

Accordingly, there is a need for a receptacle connector that allows mating and unmating of a plug connector in a confined space.

BRIEF DESCRIPTION OF THE INVENTION

In one embodiment, a receptacle connector is provided that includes a receptacle housing having a housing cavity that is configured to receive a plug connector when the plug connector is inserted into the housing cavity along a mating axis. The housing cavity is defined by an interior sidewall that extends along the mating axis and has a guide track thereon. The receptacle connector also includes a communication component that is disposed within the housing cavity and configured to communicatively engage the plug connector. The receptacle connector also includes a coupling member that is disposed within the housing cavity and is configured to engage the plug connector. The coupling member is movable bi-directionally along the mating axis and has a latch element that is slidably engaged to the guide track of the sidewall. The guide track forces the latch element toward the plug connector as the coupling member moves along the mating axis. The latch element capturing the plug connector in a locked position.

In a particular embodiment, the guide track is configured to force the latch element away from the plug connector when the plug connector is moved from the locked position toward the communication component. The latch element disengages from the plug connector to allow withdrawal of the plug connector from the housing cavity.

In another embodiment, a receptacle connector is provided that includes a receptacle housing having a housing cavity that is configured to receive a plug connector when the plug connector is inserted into the housing cavity along a mating axis. The receptacle connector also includes a communication component that is disposed within the housing cavity and configured to communicatively engage the plug connector. The receptacle connector also includes a coupling member that is disposed within the housing cavity and is movable along the mating axis. The coupling member has a support frame and a plurality of latch elements that are coupled to the support frame. The latch elements extend in a direction away from the communication component and have a plug-reception space therebetween configured to receive the plug connector. The receptacle housing is configured to engage and force the latch elements to move between retracted and engaged positions when the coupling member is moved along the mating axis. The latch elements are spaced apart from the plug connector in the retracted positions and engaged to the plug connector in the engaged positions.

In yet another embodiment, a receptacle connector is provided that includes a receptacle housing having a housing cavity that is configured to receive a plug connector when the plug connector is inserted into the housing cavity along a mating axis. The housing cavity defined by an interior sidewall that extends along the mating axis and has a guide track thereon. The receptacle connector also includes a communication component that is disposed within the housing cavity and configured to communicatively engage the plug connector. The receptacle connector also includes a coupling member that is disposed within the housing cavity. The coupling member is movable bi-directionally along the mating axis and has a latch element that is slidably engaged to the guide track of the sidewall. Insertion of the plug connector into the housing cavity moves the coupling member along the mating axis toward the communication component, whereby the latch element is forced toward the plug connector by the guide track to capture the plug connector in a locked position.

DETAILED DESCRIPTION OF THE INVENTION

Figure 1:
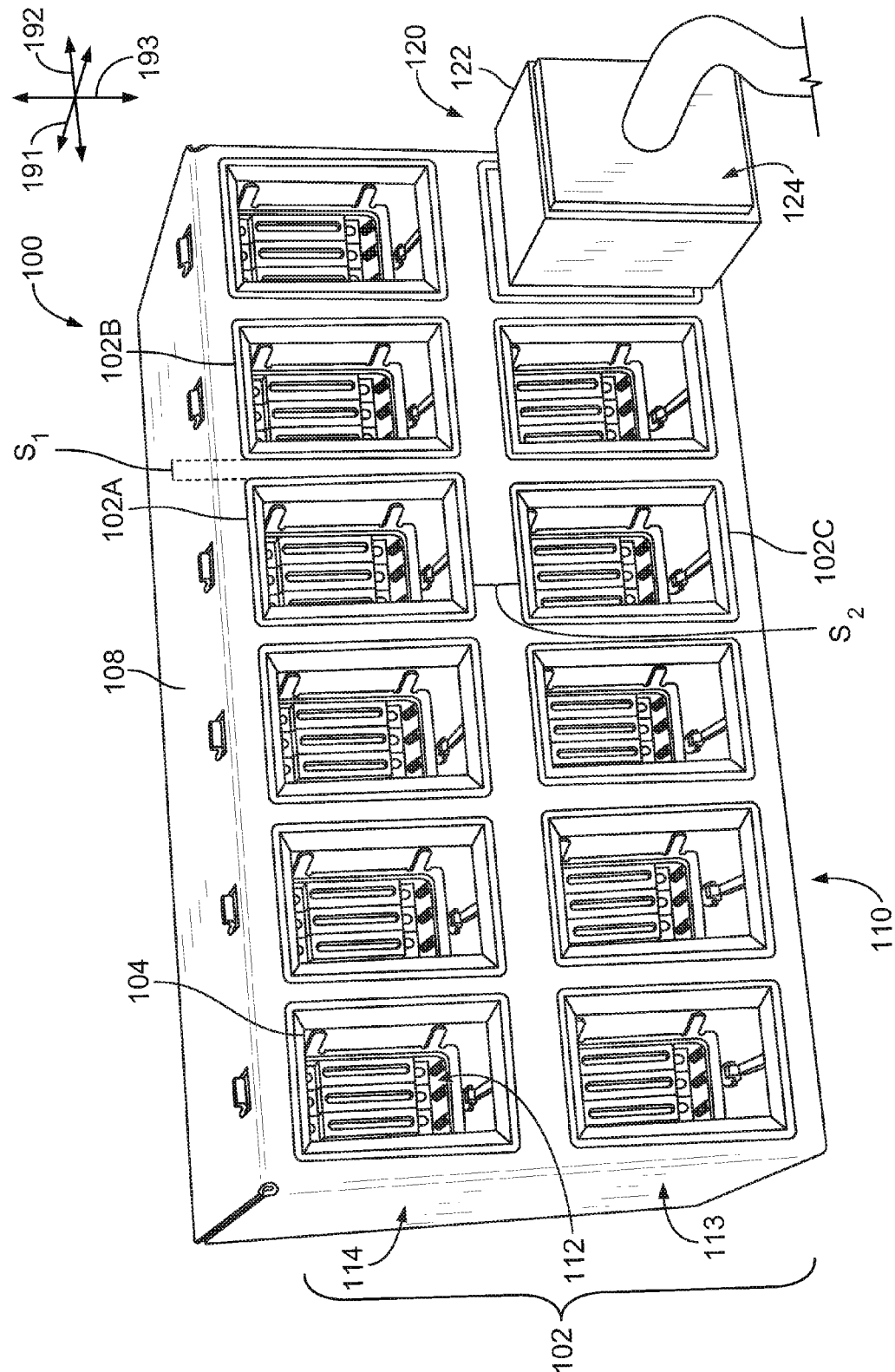
FIG. 1 is a perspective view of a communication system formed in accordance with one embodiment.

FIG. 1 is a perspective view of a communication system or assembly 100 formed in accordance with one embodiment that includes an array of communication ports 102. The communication system 100 also includes receptacle connectors 104 that are aligned with corresponding ports 102 and configured to receive and communicatively engage with plug connectors 120 (also referred to as modular connectors). The plug connector 120 includes a plug header 122 and a cable (not shown) that can extend from a loading end 124 of the plug header 122. In an exemplary embodiment, the plug and receptacle connectors 120, 104 establish an optical connection. However, in other embodiments, the plug and receptacle connectors 120, 104 may establish an electrical connection or an electro-optical connection. As shown, the communication system 100 and corresponding components are oriented with respect to mutually perpendicular axes 191-193 including a mating axis 191, a lateral axis 192, and an orientation axis 193.

The communication system 100 includes a system shell or housing 108 that may be a single continuous structure or a plurality of elements connected together to form the structure. The system shell 108 holds the receptacle connectors 104 within a chamber 215 (shown in FIG. 4). In an exemplary embodiment, the communication system 100 is part of a patch panel that includes a plurality of the system shells 108. However, in other embodiments, the communication system 100 may be other types of systems that use receptacles, such as switch boxes, wiring closets, and computer I/O. As shown, the system shell 108 has a mating side 110 that includes the communication ports 102. The communication ports 102 are arranged along two rows 113, 114 in which each row 113, 114 includes a plurality of communication ports 102. Each communication port 102 has an opening 112 through the mating side 110 that allows access to the corresponding receptacle connector 104. To communicatively engage associated receptacle and plug connectors 104, 120, a leading end 126 (shown in FIG. 7) of the plug header 122 is inserted through the opening 112 into the receptacle connector 104 along the mating axis 191.

In an exemplary embodiment, at least some of the communication ports 102 are located immediately adjacent to each other. For example, adjacent communication ports 102A and 102B may be separated by a spacing $S_1$, and adjacent communication ports 102A and 102C may be separated by a spacing $S_2$. The spacings $S_1$ and $S_2$ may not be suitable for a user's finger or for a tool to be inserted therein for removing the corresponding plug headers 122. However, embodiments described herein are not limited to having communication ports 102 and receptacle connectors 104 that are located immediately adjacent to one another. For example, in other embodiments, the communication ports 102 or receptacle connectors 104 are spaced sufficiently far apart from each other so that the plug headers 122 can be gripped by an individual's fingers or tool.

Figure 2:
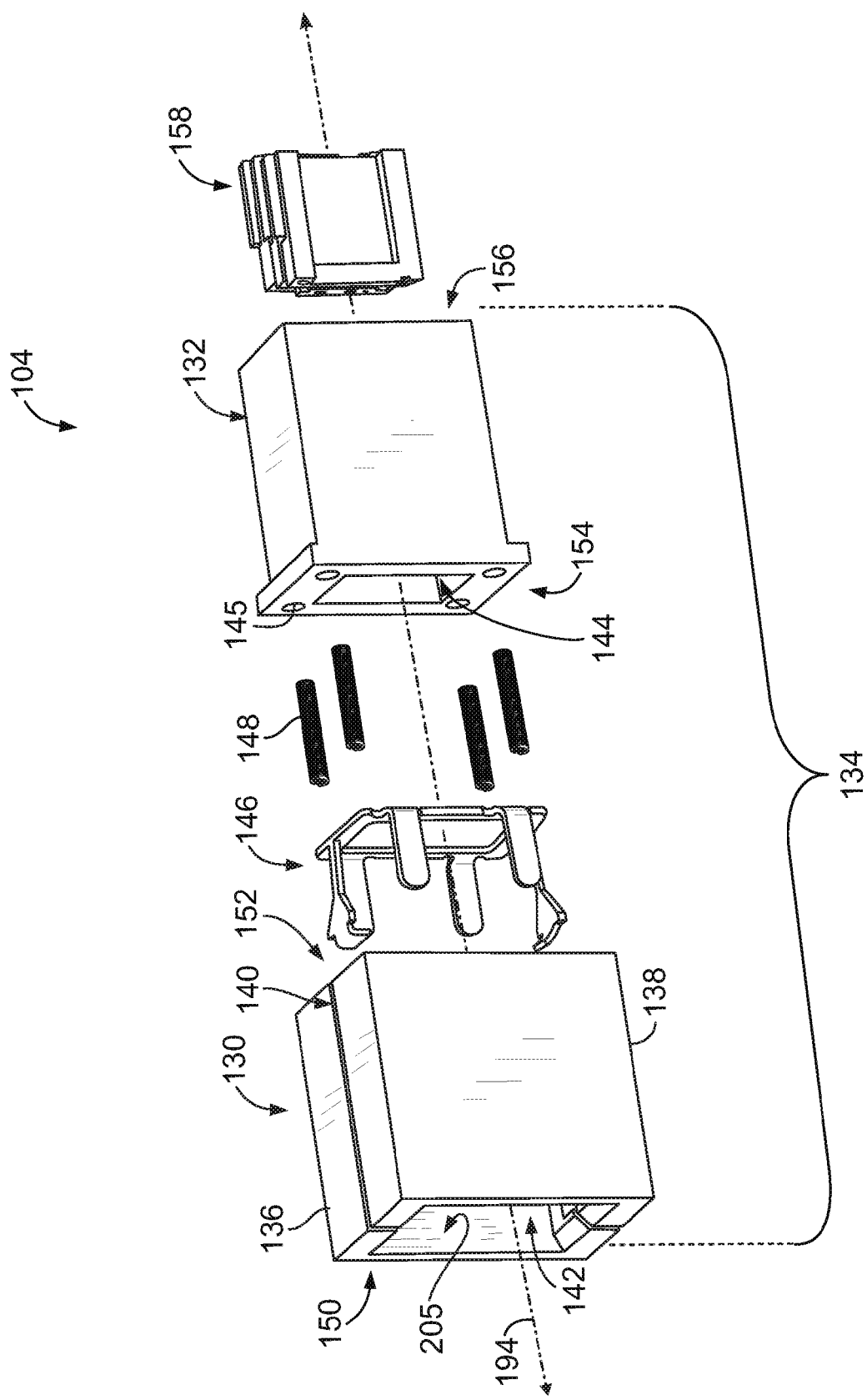
FIG. 2 is an exploded view of a receptacle connector formed in accordance with one embodiment that may be used with the communication system of FIG. 1.

FIG. 2 is an exploded view of the receptacle connector 104 with the elements of the receptacle connector 104 aligned along a central longitudinal axis 194. The receptacle connector 104 includes first and second bodies 130, 132. The first body 130 has mating and trailing ends 150, 152, and the second body has leading and loading ends 154, 156. In the illustrated embodiment, the first and second bodies 130, 132 are configured to be coupled together to form a receptacle housing 134 of the receptacle connector 104. As shown, the first body 130 can include a pair of opposing body shells 136, 138 that engage each other along an interface 140. When engaged, the body shells 136, 138 define a cavity portion 142 therebetween. The second body 132 includes a cavity portion 144 and one or more holes 145 located along the leading end 154.

The receptacle connector 104 also includes a coupling member 146, one or more biasing members 148, and one or more communication components 158. The coupling member 146 and the biasing members 148 are configured to be disposed within the cavity portion 142 of the first body 130, and the communication components 158 are configured to be disposed within the cavity portion 144. In the illustrated embodiment, the biasing members 148 are coil springs. However, other types of biasing members may be used in alternative embodiments, such as spring-loaded tabs, resilient fingers, coil-less springs, and the like.

In an exemplary embodiment, the communication components 158 are optical modules that include, for example, fiber optic terminals for connecting with optical fibers. In alternative embodiments, the communication components may be electrical modules having conductors therein or electro-optical modules having electrical and optical components. As shown in FIG. 2, a plurality of the communication components 158 can be stacked adjacent and slidable alongside each other. In other embodiments, only one communication component 158 is held within the receptacle housing 104.

As shown, the longitudinal axis 194 extends through the cavity portions 142, 144. The longitudinal axis 194 extends parallel to the mating axis 191 (FIG. 1). To assemble the receptacle connector 104, the biasing members 148 are located within corresponding holes 145 of the second body 132. The leading end 154 of the second body 132 and the coupling member 146 are disposed between the opposing body shells 136, 138. The body shells 136, 138 are then coupled together along the interface 140 thereby surrounding the coupling member 146 and the leading end 154 of the second body 132 within the cavity portion 142. As will be described in greater detail below, the body shells 136, 138 include interior sidewalls 205, 204 (FIG. 4), respectively, that have corresponding guide tracks thereon that are used to move the coupling member 146 within the cavity portion 142 bi-directionally along the mating axis 191 (or longitudinal axis 194).

As described above, the receptacle housing 134 may be formed from a plurality of distinct components. However, in alternative embodiments, the receptacle housing may be a single continuous part or may include fewer or more components than shown in FIG. 2. The alternative receptacle housings may include similar features as the receptacle housing 134. For example, the alternative receptacle housings may include the interior sidewalls and guide tracks that are described in greater detail below.

Figure 3:
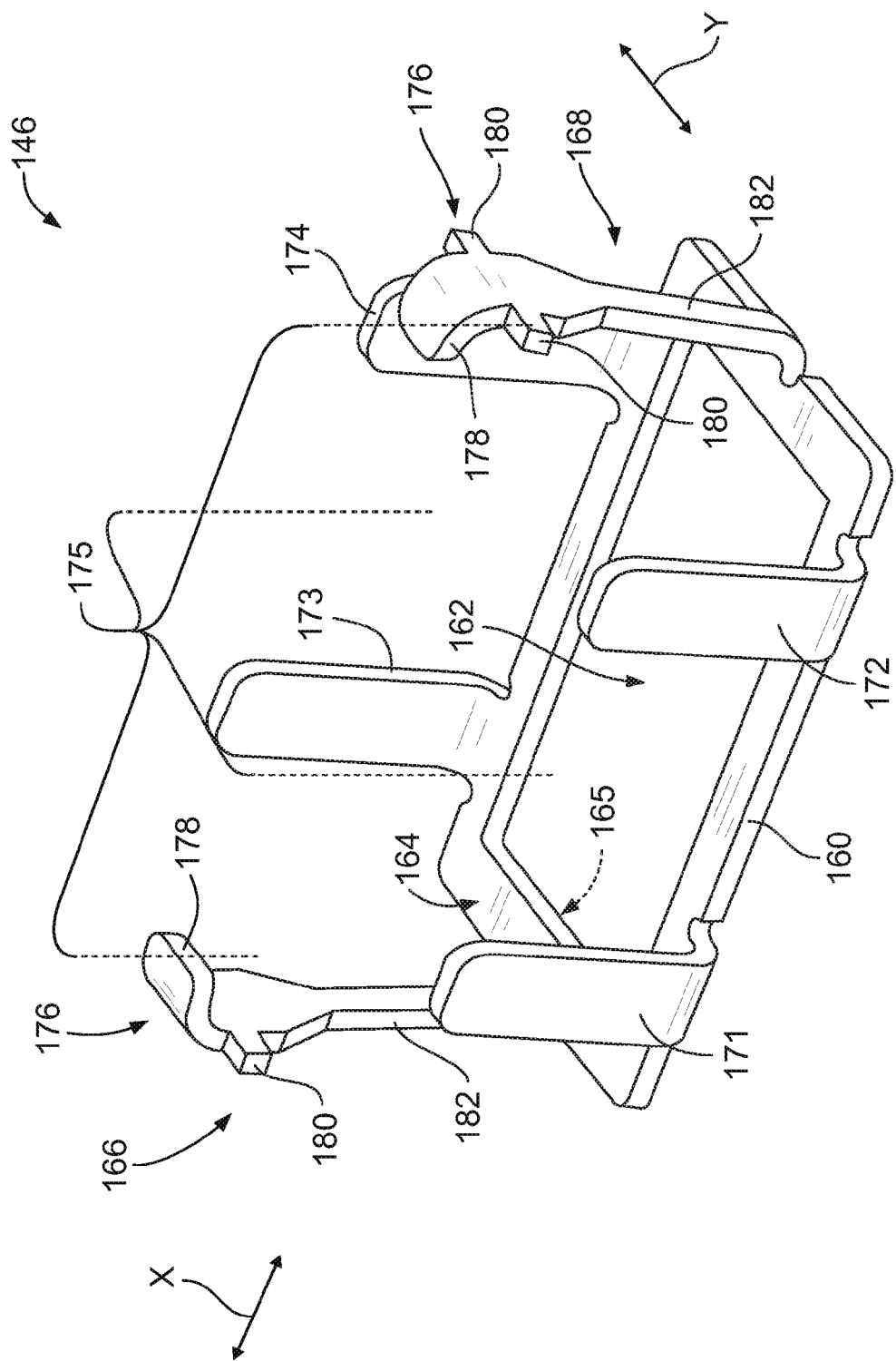
FIG. 3 is a perspective view of a coupling member that may be used with the receptacle connector of FIG. 2.

FIG. 3 is a perspective view of the coupling member 146. In an exemplary embodiment, the coupling member 146 includes a support frame 160 that defines an opening or passage 162. The opening or passage 162 is sized and shaped to permit the communication components 158 (FIG. 2) and/or communication components of the plug connector 120 (FIG. 1) to be inserted therethrough. The support frame 160 has opposite support and loading surfaces 164, 165 and a plurality of projections that extend from the support surface 164. The projections may extend in a substantially common direction away from the support surface 164 along the mating axis 191 (FIG. 1). For example, the projections may include latch elements 166, 168 and guide elements 171-174. In the illustrated embodiment, the latch elements 166 and 168 oppose each other and the guide elements 171, 172 oppose the guide elements 173, 174. However, other configurations can be used. As shown, the latch elements 166, 168 and the guide elements 171-174 are distributed around a plug-reception space 175. The plug-reception space 175 is configured to receive the plug connector 120.

In an exemplary embodiment, each latch element 166, 168 has an end portion 176 that includes respective grip members 178 that are configured to engage the plug connector 120. As shown, the grip members 178 may include curved tabs or latches. However, the grip members 178 may have any shape or structure that is suitable for releasably attaching to the plug connector 120. For example, alternative grip members may include holes that receive pins from the plug connector 120. The end portion 176 may also include one or more track members 180. In the illustrated embodiment, each end portion 176 includes a pair of track members 180 that project away from each other.

The latch elements 166, 168 include respective beam portions 182 that extend from the support frame 160 to the respective end portions 176. The latch elements 166, 168 are configured to flex to and from the longitudinal axis 194 (FIG. 2) or to and from the plug-reception space 175 along a flex direction X. In particular embodiments, the beam portions 182 are sized and shaped to permit the latch elements 166, 168 to also flex laterally along a flex direction Y. The flex directions X and Y are substantially perpendicular to each other.

Figure 4:
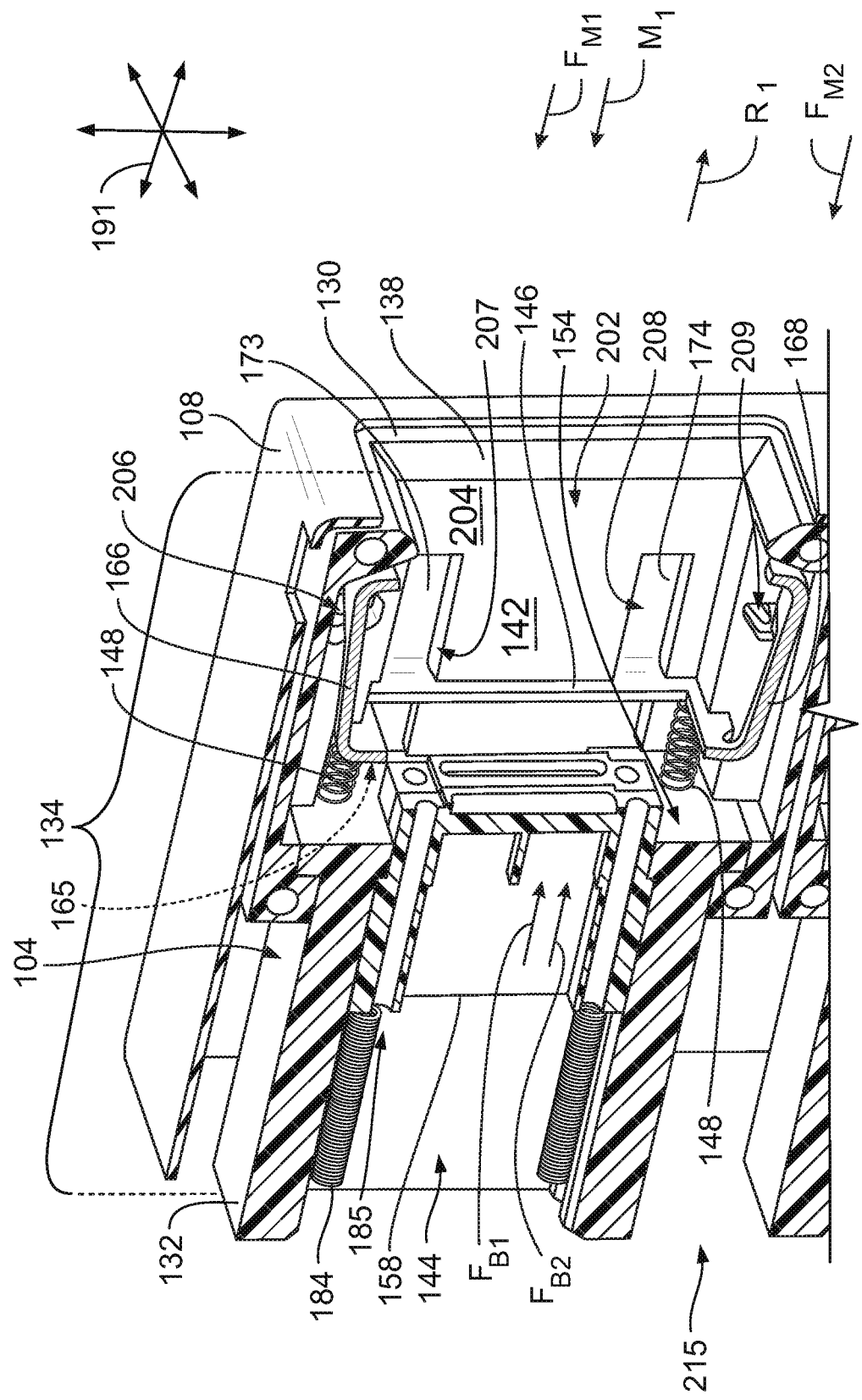
FIG. 4 shows a cross-section of the receptacle connector of FIG. 2 after the receptacle connector is assembled.

FIG. 4 shows a cross-section of a portion of the communication system 100 (FIG. 1) illustrating one of the receptacle connectors 104 in greater detail. The receptacle connector 104 is held within the chamber 215 of the system shell 108. In the illustrated embodiment, the coupled first and second bodies 130, 132 form the receptacle housing 134 and the cavity portions 142, 144 form a housing cavity 202. The housing cavity 202 is configured to receive the plug connector 120 (FIG. 1). The coupling member 146 and the communication components 158 are disposed within the housing cavity 202. The coupling member 146 is slidably held by the receptacle housing 134. When the plug connector 120 is inserted into the housing cavity 202, a first axial mating force $F_{M1}$ provided by a user or machine advances the plug connector 120 toward the communication components 158 along the mating axis 191 in an insertion or mating direction $M_1$.

An interior sidewall 204 of the body shell 138 extends along the mating axis 191 and defines the cavity portion 142 and the housing cavity 202. The interior sidewall 204 has one or more guide tracks 206-209 thereon that are operatively engaged to the coupling member 146. The guide tracks 206 and 209 are configured to receive track members 180 (FIG. 3) from the latch elements 166, 168, respectively. The track members 180 are slidably engaged to the guide tracks 206, 209, which have non-linear paths. The guide tracks 207 and 208 are configured to receive the guide elements 173, 174, respectively, which are also slidably engaged to the guide tracks 207, 208. The guide tracks 207, 208 have linear paths that extend along the mating axis 191. Although not shown, the body shell 136 (FIG. 2) may also include similar guide tracks that are configured to receive the track members 180 of the latch element 166, 168 and also the guide elements 171, 172 (FIG. 3). Accordingly, the coupling member 146 is slidably held within the housing cavity 202 by the guide tracks 206-209 and is movable along the mating axis 191.

The biasing members 148 can be located between the leading end 154 of the second body 132 and the loading surface 165 of the coupling member 146. The biasing members 148 are configured to provide an axial force $F_{B1}$ in a removal direction $R_1$ that is substantially opposite the insertion direction $M_1$. The axial force $F_{B1}$ may also be referred to as a biasing or spring force. As shown in FIG. 4, the coupling member 146 is in an open configuration in which the plug connector 120 is permitted to be inserted into the housing cavity 202 and into the plug-reception space 175 (FIG. 3). In the open configuration, the biasing members 148 provide the biasing force $F_{B1}$ that presses against the coupling member 146 and pushes the coupling member 146 in the removal direction $R_1$. The sidewall 204 and/or one or more of the guide tracks 206-209 cooperate with the biasing members 148 to hold the coupling member 146 in the open configuration. For instance, the guide tracks 206-209 include positive stops that prevent the coupling member 146 from moving beyond a predetermined point in the removal direction $R_1$.

Embodiments described herein include an attachment mechanism 250 (shown in FIG. 5) that is configured to hold the plug connector 120 (FIG. 1) within the housing cavity 202 when the plug connector 120 is inserted therein and to release the plug connector 120 when desired. In the illustrated embodiment, the attachment mechanism 250 includes the coupling member 146 and the receptacle housing 134 or, more specifically, the latch elements 166, 168 and the guide tracks 206, 209. The receptacle housing 134 is operatively engaged to the coupling member 146 so that the coupling member 146 is bi-directionally movable relative to the receptacle housing 134 along the mating axis 191. The latch elements 166, 168 are movable to and from the plug connector 120. In particular embodiments, the attachment mechanism 250 is internal (e.g., within the housing cavity 202).

Figure 8:
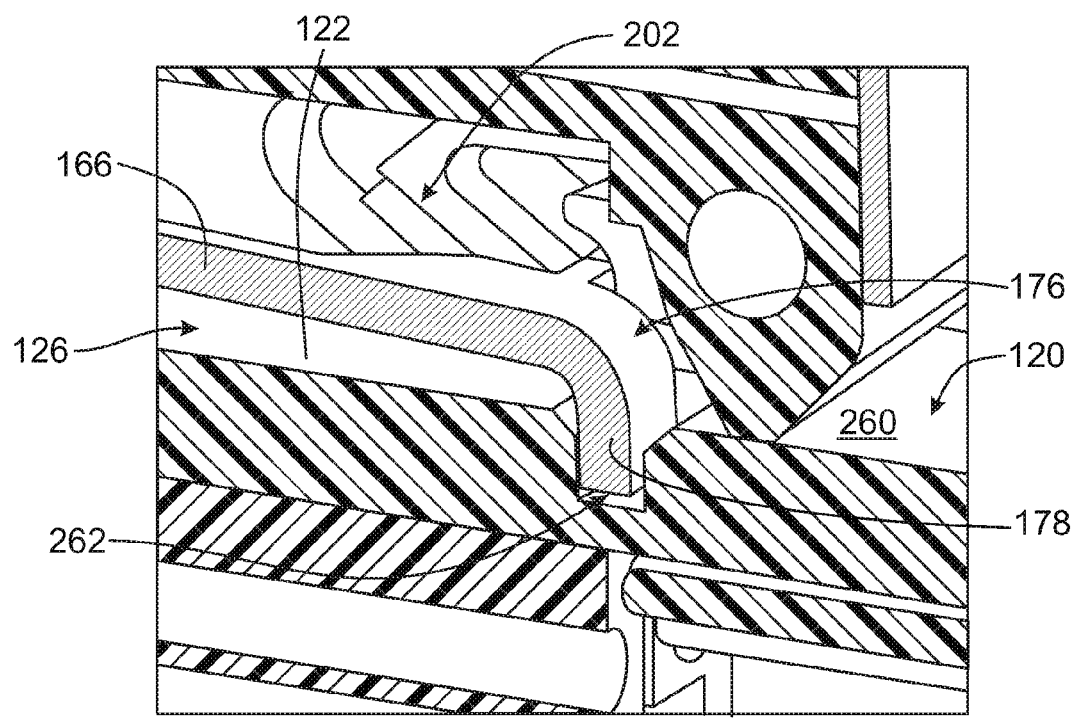
FIG. 8 is an enlarged cross-section of the receptacle connector showing the latch element in an engaged position.

The attachment mechanism 250 is configured to engage the plug connector 120 when the first axial force $F_{M1}$ is applied in the insertion direction $M_1$. For instance, insertion of the plug connector 120 into the housing cavity 202 moves the coupling member 146 along the mating axis 191 toward the communication component 158, whereby the latch elements 166, 168 are forced toward the plug connector 120 by the guide tracks 206, 209, respectively, to capture the plug connector 120 in a locked position (as shown in FIG. 8). Once held in the locked position in the housing cavity 202, the attachment mechanism 250 is configured to release the plug connector 120 when a second axial force $F_{M2}$ is applied in the same direction. For example, the guide tracks 206, 209 may force the latch elements 166, 168, respectively, away from the plug connector 120 when the plug connector 120 is moved from the locked position toward the communication component 158. The latch elements 166, 168 can disengage from the plug connector 120 to allow withdrawal of the plug connector 120 from the housing cavity 202.

In some embodiments, the communication components 158 may be movable bi-directionally along the mating axis 191. For example, the receptacle connector 104 may include one or more biasing members 184. The biasing member 184 at one end may engage a loading side 185 of the communication component 158 and, at the other end, engage an interior surface (not shown) of the receptacle housing 134 or the system shell 108. The biasing members 184 can provide an axial force $F_{B2}$ in a direction that is substantially parallel to the axial force $F_{B1}$ or the mating axis 191. When the plug connector 120 is engaged to the communication components 158 and moves in the insertion direction $M_1$, the biasing members 184 may permit the communication components 158 to be moved in the insertion direction $M_1$ while providing the axial force $F_{B2}$ in the removal direction $R_1$. However, the axial force $F_{B2}$ can be configured so that the plug connector 120 and the communication components 158 are communicatively engaged before the biasing members 158 permit movement of the communication components 158. In other words, the axial force $F_{B2}$ may be great enough to overcome any frictional forces that may occur when the communication components 158 and the plug connector 120 mate with each other. As shown, the biasing members 184 may be similar to the biasing members 148 (e.g., coil springs). However, other types of biasing members that are capable of providing the axial force $F_{B2}$ may be used, such as spring-loaded tabs, resilient fingers, coil-less springs, and the like.

As such, the receptacle connector 104 and the plug connector 120 may have a push-push type of mating relationship in which the plug connector 120 is pushed in the insertion direction $M_1$ to communicatively engage the receptacle connector 104 and pushed again in the insertion direction $M_1$ thereby triggering the attachment mechanism 250 to release the plug connector 120 so that the plug connector 120 is free to be withdrawn in the removal direction $R_1$.

Figure 5:
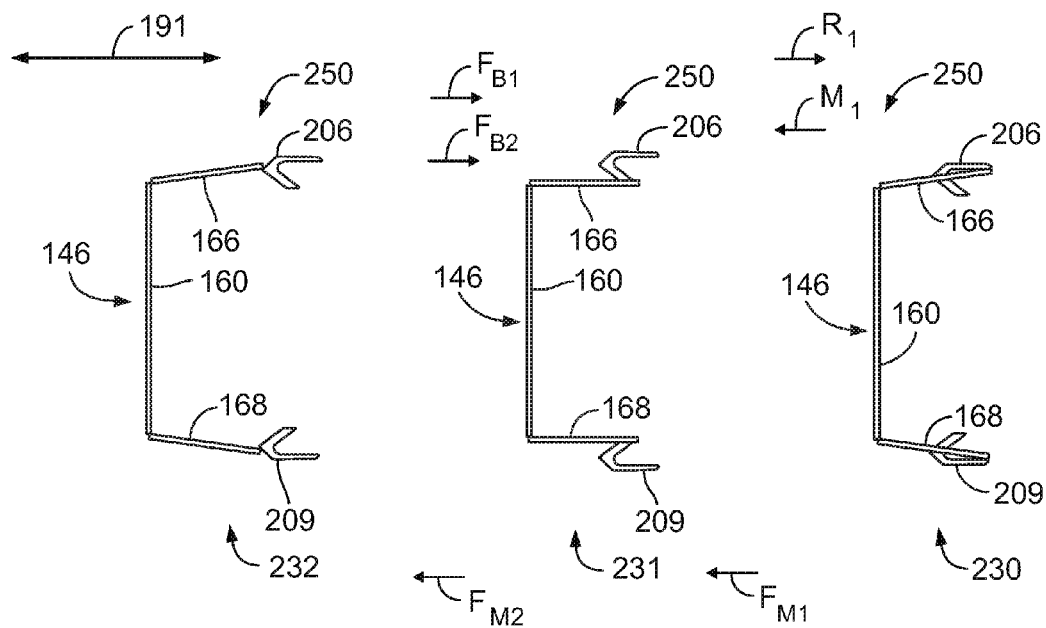
FIG. 5 is a schematic illustration showing the coupling member of FIG. 3 at various mating stages.

FIGS. 5-8 illustrate the attachment mechanism 250 of the receptacle connector 104 (FIG. 1) in greater detail. FIG. 5 schematically illustrates the coupling member 146 and the guide tracks 206, 209 at different mating stages. The coupling member 146 is configured to move through a predetermined sequence of mating stages 230-232, including a receiving stage 230, an interlocked stage 231, and a released stage 232. In each of the mating stages 230-232, the coupling member 146 has a different axial location with respect to the guide tracks 206, 209 and the communication component 158 (FIG. 2). During operation of the attachment mechanism 250, the coupling member 146 and the guide tracks 206, 209 cooperate with one another to move the coupling member 146 from one stage to the next. For example, the guide tracks 206, 209 translate driving forces applied to the coupling member 146 by the user or the biasing members 148 (FIG. 2) in order to move the latch elements 166, 168. For illustrative purposes, only the guide tracks 206, 209, the coupling member 146, and the elements of the coupling member 146 are shown in FIG. 5.

When the coupling member 146 is in the receiving stage 230, the coupling member 146 has the open configuration (e.g., the latch elements 166, 168 are in retracted positions and ready to receive the plug connector 120 (FIG. 1)) and is positioned at a first axial location. The biasing members 148 and the guide tracks 206, 209 hold the coupling member 146 in a fixed position. The support frame 160 is dimensioned relative to the plug connector 120 so that the leading end 126 (FIG. 7) of the plug connector 120 engages the support surface 164 (FIG. 3) when inserted into the housing cavity 202 (FIG. 3). When the plug connector 120 engages the support frame 160, the axial force $F_{M1}$ moves the coupling member 146 along the mating axis 191 to the interlocked stage 231. As the coupling member 146 transitions from the receiving stage 230 to the interlocked stage 231, the latch elements 166, 168 are forced toward the plug connector 120 by the guide tracks 206, 209, respectively. The latch elements 166, 168 engage and capture the plug connector 120 in the locked position. In the interlocked stage 231, the coupling member 146 is held in a fixed positioned at a second axial location that is closer to the communication component 158 than the first axial location. The coupling member 146 is in the closed configuration as shown in FIG. 5. The latch elements 166, 168 are in the engaged position with respect to the plug connector 120 and are configured to prevent the plug connector 120 from being withdrawn. As the coupling member 146 transitions from the receiving stage 230 to the interlocked stage 231, the plug connector 120 engages the communication components 158. The communication components 158 may or may not move in the insertion direction $M_1$. When in the interlocked stage 231, the plug connector 120 is communicatively engaged to the communication components 158.

To release the plug connector 120, the axial force $F_{M2}$ is applied to the plug connector 120 whereby the coupling member 146 is moved from the interlocked stage 231 to the released stage 232. As shown in FIG. 5, the coupling member 146 may have similar open configurations in the receiving stage 230 and the released stage 232. However, the latch elements 166, 168 are slidably engaged at different points along the guide tracks 206, 209, respectively, at the receiving stage 230 and at the released stage 232. In the illustrated embodiment, the coupling member 146 is not held in a fixed position at the released stage 232. Once the coupling member 146 has reached a third axial location of the released stage 232 and the axial force $F_{M2}$ is withdrawn, the axial force $F_{B1}$ from the biasing members 148 (FIG. 2) moves the coupling member 146 from the released stage 232 to the receiving stage 230. Accordingly, the biasing members 148 operate with the guide tracks 206, 209 to reset the attachment mechanism 250 once the axial force $F_{M2}$ is withdrawn.

In some embodiments, as the coupling member 146 transitions from the interlocked stage 231 to the released stage 232, the communication components 158 move with the plug connector 120. In such embodiments, the biasing members 184 (FIG. 4) are configured to permit movement of the communication components 158 in the insertion direction $M_1$. As the coupling member 146 transitions from the released stage 232 to the receiving stage 230, the axial force $F_{B2}$ provided by the biasing members 184 moves the communication components 158 in the removal direction $R_1$. The communication components 158 and the plug connector 120 may be disengaged when the coupling member 146 is at the receiving stage 230.

In an exemplary embodiment, the coupling member 146 and the communication components 158 are separately movable. In such embodiments, the coupling member 146 and the communication components 158 are capable of moving at different, but overlapping periods of time. For example, when the coupling member 146 initially moves from the receiving stage 230 to the interlocked stage 231, the communication components 158 may be unengaged to the plug connector 120. As such, the communication components 158 do not move with respect to the receptacle housing 134 when the coupling member 146 is moving with respect to the receptacle housing 134. However, prior to the coupling member 146 reaching the second axial location, the communication components 158 are mated with the plug connector 120. At this time, the communication components 158 may be movable with the plug connector 120. Likewise, when the coupling member 146 transitions from the released stage 232 to the receiving stage 230, the plug connector 120 and the communication components 158 may become disengaged before the coupling member 146 reaches the first axial location.

In an exemplary embodiment, the sidewall 205 (FIG. 2) of the body shell 136 (FIG. 2) also has guide tracks (not shown) thereon that oppose the guide tracks 206, 209. For each latch element 166, 168, the opposite track members 180 (FIG. 3) are configured to be inserted into the opposing guide tracks. In such embodiments, each of the latch elements 166, 168 is slidably engaged to two opposing guide tracks.

Figure 6:
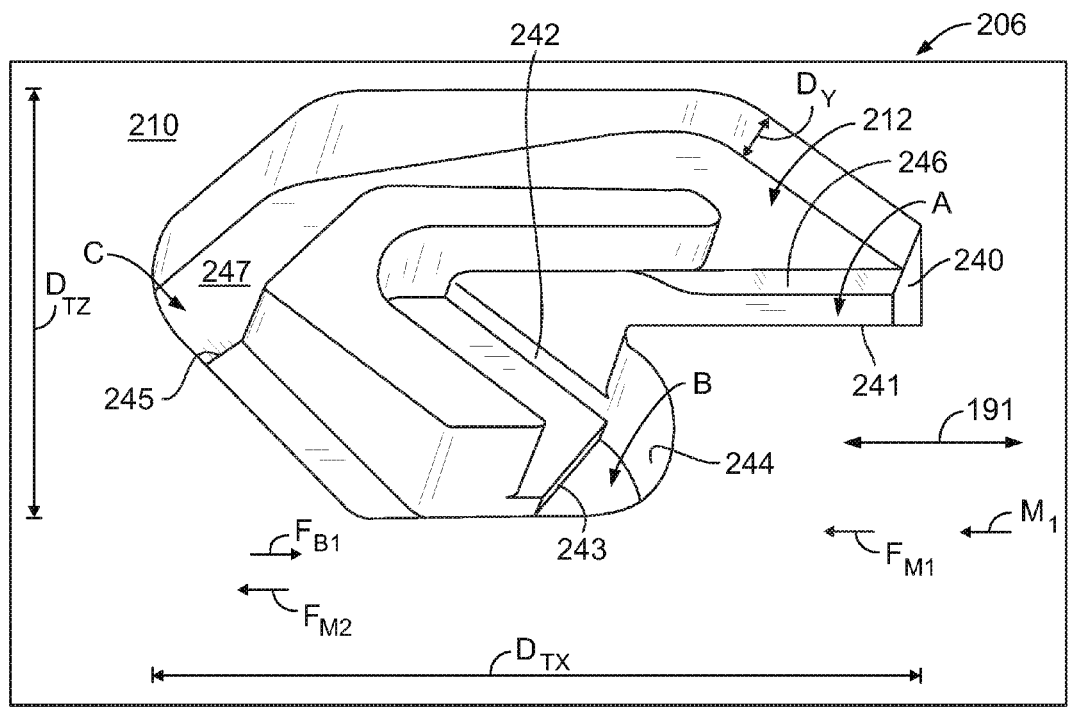
FIG. 6 is an enlarged view of an interior sidewall of the receptacle connector of FIG. 2 illustrating a guide track in greater detail.

FIG. 6 illustrates the exemplary guide track 206 in greater detail. The guide track 209 (FIG. 4) may have a configuration that is symmetrical to the guide track 206 with respect to the mating axis 191. The guide track 206 can be a groove or channel 212 formed in a wall surface 210 of the interior sidewall 204 (FIG. 4). In an exemplary embodiment, the channel 212 is sized and shaped to receive the track member 180 (FIG. 3) of the latch element 166 (FIG. 3). The guide track 206 has track surfaces 240-247 that are configured to direct the track member 180 along predetermined paths and/or hold the track member 180 in predetermined positions. In an exemplary embodiment, the wall surface 210 extends along a plane defined by the mating axis 191 and the orientation axis 193 (FIG. 1).

However, in alternative embodiments, suitable guide tracks may be formed on other wall surfaces of the receptacle housing 134 (FIG. 2). For example, a wall surface having a guide track may extend along a plane that is defined by the mating axis 191 and the lateral axis 192 (FIG. 1). In such an embodiment, the plug connector 120 (FIG. 1) would need to be reconfigured for engaging the latch element. Also, in alternative embodiments, the guide track 206 may not be a groove but could be or include a rail that projects from the wall surface 210. In such embodiments, the latch element 166 may couple to or grip the rail.

As shown, the guide track 206 has a non-linear path or course. The course may extend a total distance $D_{TX}$ along the mating axis 191 and a total distance $D_{TZ}$ along the orientation axis 193 or, alternatively, the lateral axis 192. In an exemplary embodiment, the guide track 206 is a continuous course such that the track member 180 is capable of repeating the course without backtracking along the course or being removed from the course (e.g., clearing the groove). In such embodiments, the attachment mechanism 250 (FIG. 5) is permitted to be reset. Also shown in FIG. 6, the guide track 206 may extend a depth $D_Y$ from the wall surface 210 to a bottom surface 247 of the guide track 206. In particular embodiments, the depth $D_Y$ varies along the guide track 206. The opposing guide track (not shown) on the sidewall 205 (FIG. 2) may have an oppositely varied depth. For example, as the depth $D_Y$ decreases, the depth of the opposing guide track may increase at the same rate and vice versa. In this manner, the latch element 166 is permitted to move laterally between the sidewalls 204, 205.

When the coupling member 146 (FIG. 2) is at the receiving stage 230 (FIG. 5), the track member 180 is located at point A along the guide track 206. At point A, the track member 180 can be in a fixed position. For example, the track member 180 may be pressed by the biasing member 148 (FIG. 2) against an inner surface 240 of the guide track 206. The inner surface 240 faces generally toward the communication component 158 (FIG. 2). A stop surface 246, which correlates to a drop in the depth $D_Y$, may provide a positive stop that prevents the track member 180 from moving in an undesirable direction along the guide track 206.

As the coupling member 146 is moved from the receiving stage 230 (FIG. 5) to the interlocked stage 231 (FIG. 5), the track member 180 slides in the insertion direction $M_1$. The track member 180 may be biased against the bottom surface 247. When the track member 180 clears a stop surface 242, the track member 180 flexes into the bottom surface 247. When the axial force $F_{M1}$ is withdrawn, the axial force $F_{B1}$ presses the track member 180 against the stop surface 242. The axial force $F_{B1}$ and the stop surface 242 force the track member 180 into a predetermined location at point B. When the track member 180 is located at point B, the latch element 166 (FIG. 3) is in the engaged position. A stop surface 243 prevents the track member 180 from inadvertently moving in an undesirable direction back toward the stop surface 242. The biasing members 148 press the track member 180 against an inner surface 244.

To move the coupling member 146 from the interlocked stage 231 to the released stage 232, the axial force $F_{M2}$ is applied in the insertion direction $M_1$. The track member 180 moves from point B to a point C. After the track member 180 clears another stop surface 245, the track member 180 is at point C and in the released stage 232. In the released stage 232, when the axial force $F_{M2}$ is removed, the biasing members 148 move the track member 180 along the guide track 206 to the point A. Accordingly, the attachment mechanism 250 is then reset and ready to receive the plug connector 120 again.

Figure 7:
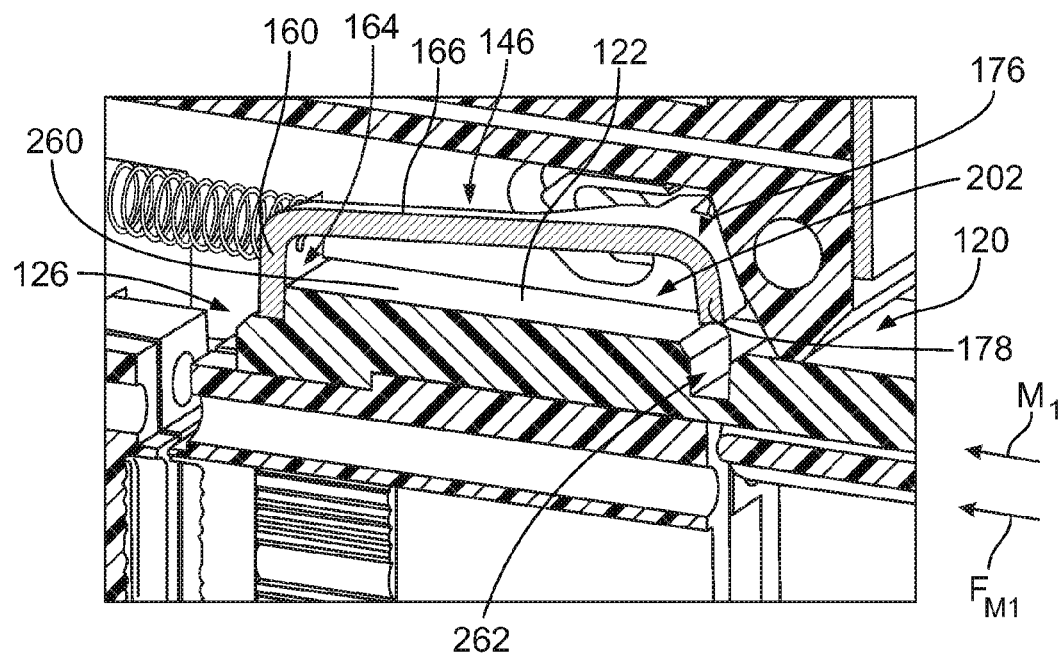
FIG. 7 is an enlarged cross-section of the receptacle connector showing a latch element of the coupling member in a retracted position.

FIGS. 7 and 8 are enlarged cross-sections illustrating the latch element 166 in the retracted position (FIG. 7) and in the engaged position (FIG. 8). As shown, the plug header 122 has an outer surface 260 that defines an outer perimeter of the plug connector 120. The plug header 122 may include a latch-engagement feature 262 that is configured to engage the end portion 176 of the latch element 166. In particular embodiments, the latch-engagement feature 262 does not project away from the outer surface 260 or increase the outer perimeter of the leading end 126. For example, in the illustrated embodiment, the latch-engagement feature 262 includes a recess that is sized and shaped to receive the grip member 178. The recess extends a depth from the outer surface 260 into the plug header 122.

As shown in FIG. 7, when the leading end 126 of the plug connector 120 is inserted into the housing cavity 202, the plug connector 120 engages the support surface 164 of the support frame 160 thereby moving the coupling member 146 in the insertion direction $M_1$ and providing the axial force $F_{M1}$. The axial force $F_{M1}$ is the driving force that moves the latch element 166 from the retracted position to the engaged position. As shown, the grip member 178 is received within the latch-engagement feature 262 thereby gripping the plug connector 120 and preventing an inadvertent withdrawal of the plug connector 120.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the subject matter described and/or illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:
1. A receptacle connector comprising:
a receptacle housing having a housing cavity that is configured to receive a plug connector when the plug connector is inserted into the housing cavity along a mating axis, the receptacle housing including guide tracks that extend along the housing cavity;
a communication component disposed within the housing cavity and configured to communicatively engage the plug connector; and a coupling member disposed within the housing cavity and configured to engage the plug connector, the coupling member being movable bi-directionally along the mating axis and having latch elements that are slidably engaged to corresponding guide tracks of the receptacle housing, the guide tracks forcing the corresponding latch elements toward the plug connector as the coupling member moves along the mating axis, the latch elements capturing the plug connector in a locked position.

2. The receptacle connector of claim 1, wherein each of the guide tracks is configured to hold the corresponding latch element in retracted and engaged positions, the latch elements being spaced apart from the plug connector in the retracted positions and engaged to the plug connector in the engaged positions.

3. The receptacle connector of claim 2, wherein the coupling member is located at a first axial location along the mating axis when the latch elements are held in the retracted positions, the coupling member being located at a second axial location when the latch elements are held in the engaged positions, the second axial location being closer to the communication component than the first axial location.

4. The receptacle connector of claim 1, wherein the coupling member includes a support frame that is configured to engage the plug connector, the latches elements moving with respect to the support frame.

5. The receptacle connector of claim 4, wherein the support frame defines an opening that is dimensioned to receive at least one of the communication component and the plug connector.

6. The receptacle connector of claim 1, wherein the guide tracks are configured to force the corresponding latch elements away from the plug connector when the plug connector is moved from the locked position toward the communication component, the latch elements disengaging from the plug connector to allow withdrawal of the plug connector from the housing cavity.

7. The receptacle connector of claim 1, further comprising a biasing member disposed within the housing cavity, the biasing member configured to provide a biasing force against the coupling member in a direction away from the communication component, the guide tracks preventing the biasing member from moving the coupling member away from the communication component beyond a predetermined point.

8. The receptacle connector of claim 1, wherein each of the guide tracks comprises a groove that extends along a path.

9. The receptacle connector of claim 8, wherein the groove has a depth that varies along the path thereby moving the corresponding latch element laterally along a direction that is perpendicular to the mating axis.

10. The receptacle connector of claim 1, wherein the guide tracks include first and second guide tracks and the latch elements include first and second latch elements that slidably engage the first and second guide tracks, respectively, the first and second latch elements opposing each other.

11. A receptacle connector comprising:
a receptacle housing having a housing cavity that is configured to receive a plug connector when the plug connector is inserted into the housing cavity along a mating axis;
a communication component disposed within the housing cavity and configured to communicatively engage the plug connector; and
a coupling member disposed within the housing cavity and being movable along the mating axis, the coupling member having a support frame and a plurality of latch elements coupled to the support frame, the latch elements extending in a direction away from the communication component and having a plug-reception space therebetween configured to receive the plug connector, wherein the receptacle housing is configured to engage and force the latch elements to move between retracted and engaged positions when the coupling member is moved along the mating axis, the latch elements being spaced apart from the plug connector in the retracted positions and engaged to the plug connector in the engaged positions.

12. The receptacle connector of claim 11, wherein the receptacle housing includes guide tracks that extend along the housing cavity and that are configured to slidably couple to respective latch elements.

13. The receptacle connector of claim 12, wherein the coupling member is located at a first axial location along the mating axis when the latch elements are held in the retracted positions, the coupling member being located at a second axial location when the latch elements are held in the engaged positions, the second axial location being closer to the communication component than the first axial location.

14. The receptacle connector of claim 11, wherein the support frame is dimensioned relative to the plug connector so that the plug connector engages and moves the coupling member along the mating axis when the plug connector is inserted into the housing cavity.

15. The receptacle connector of claim 11, wherein the receptacle housing is configured to engage and force the latch elements to move away from the plug connector when the coupling member is moved toward the communication component.

16. A receptacle connector comprising:
a receptacle housing having a housing cavity that is configured to receive a plug connector when the plug connector is inserted into the housing cavity along a mating axis, the receptacle housing having guide tracks that extend along the housing cavity;
a communication component disposed within the housing cavity and configured to communicatively engage the plug connector; and
a coupling member disposed within the housing cavity, the coupling member being movable bi-directionally along the mating axis and having latch elements that are slidably engaged to the guide tracks of the receptacle housing, wherein insertion of the plug connector into the housing cavity moves the coupling member along the mating axis toward the communication component, whereby the latch elements are forced toward the plug connector by the corresponding guide tracks to capture the plug connector in a locked position.

17. The receptacle connector of claim 16, wherein the guide tracks are configured to force the corresponding latch elements away from the plug connector when the plug connector is moved from the locked position toward the communication component, the latch elements disengaging from the plug connector to allow withdrawal of the plug connector from the housing cavity.

18. The receptacle connector of claim 16, wherein the latch elements are movable between retracted and engaged positions when the coupling member is moved along the mating axis, the latch elements being spaced apart from the plug connector in the retracted positions and engaged to the plug connector in the engaged positions.

19. The receptacle connector of claim 18, wherein the coupling member is movable from a first axial location to a second axial location where the plug connector is captured in the locked position, the coupling member releasing the plug connector when the coupling member is moved from the second axial location toward the communication component.

20. The receptacle connector of claim 16, further comprising a biasing member disposed within the housing cavity, the biasing member configured to provide a biasing force against the coupling member in a direction away from the communication component.

\* \* \* \* \*